(12) United States Patent
Bagchi et al.

(10) Patent No.: US 10,231,084 B2
(45) Date of Patent: *Mar. 12, 2019

(54) SYSTEM AND METHOD FOR MONITORING DEVICES RELATIVE TO A LEARNED GEOGRAPHIC AREA

(71) Applicant: Aeris Communications, Inc., San Jose, CA (US)

(72) Inventors: Anupam Bagchi, San Jose, CA (US); Yixiang Chen, Palo Alto, CA (US); Fumito Kayama, Pacifica, CA (US); Santosh Astagi, San Mateo, CA (US); Drew S. Johnson, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,725

(22) Filed: May 3, 2018

(65) Prior Publication Data

US 2018/0255428 A1    Sep. 6, 2018

Related U.S. Application Data

(63) Continuation-in-part of application No. 15/970,061, filed on May 3, 2018, and a continuation-in-part of
(Continued)

(51) Int. Cl.
*H04W 4/021* (2018.01)
*H04W 4/70* (2018.01)
*H04L 29/08* (2006.01)

(52) U.S. Cl.
CPC ............. *H04W 4/021* (2013.01); *H04L 67/02* (2013.01); *H04W 4/70* (2018.02)

(58) Field of Classification Search
CPC ...... H04W 4/021; H04W 4/005; H04L 67/10; H04L 67/02
(Continued)

(56) References Cited

U.S. PATENT DOCUMENTS 6,239,707 B1    5/2001   Park
6,496,775 B2   12/2002   McDonald, Jr.
(Continued)

FOREIGN PATENT DOCUMENTS

CN     104835029      8/2015
WO     2014106299     7/2014
(Continued)

OTHER PUBLICATIONS

International Search Report and Written Opinion from International Application No. PCT/US18/38825 dated Sep. 18, 2018.
(Continued)

*Primary Examiner* — Babar Sarwar
(74) *Attorney, Agent, or Firm* — Brundidge & Stanger, P.C.

(57) ABSTRACT

The present invention relates generally to providing a system and method for monitoring devices relative to a learned geographic area using an enablement platform for building web sites and web applications using data storage, management and publication capabilities of hosted web services. The system and method for monitoring M2M devices relative to a learned geographic area (geofence) are built on existing AerCloud concepts by configuring a geofence by using learned location attributes and evaluating geofence parameters and issuing alerts if the devices are performing outside the geofence parameters.

21 Claims, 19 Drawing Sheets

Related U.S. Application Data application No. 15/696,950, filed on Sep. 6, 2017, which is a continuation of application No. 15/234,463, filed on Aug. 11, 2016, now Pat. No. 9,774,994.

(60) Provisional application No. 62/523,748, filed on Jun. 22, 2017, provisional application No. 62/205,639, filed on Aug. 14, 2015.

(58) Field of Classification Search
USPC .......... 455/404.2, 412.1–414.2, 418–422.1, 455/41.1–41.2, 552.1, 556.1, 456.1–456.3, 455/456.5–457
See application file for complete search history.

(56) References Cited

U.S. PATENT DOCUMENTS

| | | | |
|---|---|---|---|
| 6,651,001 B2 | 11/2003 | Apsell | |
| 6,687,356 B1 | 2/2004 | Glitho et al. | |
| 6,931,309 B2 | 8/2005 | Phelan | |
| 7,213,048 B1* | 5/2007 | Parupudi | G06F 17/30241 455/456.1 |
| 7,246,009 B2 | 7/2007 | Hamblen | |
| 7,801,538 B2 | 9/2010 | Weiser | |
| 7,848,765 B2 | 12/2010 | Phillips | |
| 8,000,726 B2 | 8/2011 | Altman | |
| 8,018,329 B2 | 9/2011 | Morgan | |
| 8,135,505 B2* | 3/2012 | Vengroff | G06Q 30/02 701/24 |
| 8,346,230 B2 | 1/2013 | Goodman | |
| 8,473,148 B2 | 6/2013 | Nielsen | |
| 8,510,200 B2 | 8/2013 | Pearlman | |
| 8,566,014 B1 | 10/2013 | Kozolchyk | |
| 8,589,330 B2 | 11/2013 | Petersen | |
| 8,593,277 B2 | 11/2013 | Nath | |
| 8,595,696 B2 | 11/2013 | Maximilien et al. | |
| 8,630,768 B2 | 1/2014 | McClellan | |
| 8,725,569 B2* | 5/2014 | Liang | H04W 4/02 705/14.49 |
| 8,755,824 B1 | 6/2014 | Wang | |
| 8,756,010 B2 | 6/2014 | Gupta | |
| 8,869,038 B2 | 10/2014 | Eick | |
| 8,909,256 B2* | 12/2014 | Fraccaroli | H04W 4/02 370/328 |
| 8,913,983 B2* | 12/2014 | Lorello | H04W 4/90 455/404.2 |
| 8,949,022 B1 | 2/2015 | Fahrner | |
| 8,971,930 B2* | 3/2015 | Li | H04L 67/40 455/414.1 |
| 9,014,888 B2 | 4/2015 | Sukkarié | |
| 9,076,009 B2 | 7/2015 | Sathish | |
| 9,076,165 B2 | 7/2015 | Busch | |
| 9,104,738 B2 | 8/2015 | Kay et al. | |
| 9,119,038 B2 | 8/2015 | Woods | |
| 9,122,693 B2 | 9/2015 | Blom | |
| 9,140,567 B2 | 9/2015 | Fryer | |
| 9,141,266 B2 | 9/2015 | McCormick | |
| 9,250,887 B2 | 2/2016 | Lucovsky et al. | |
| 9,275,114 B2 | 3/2016 | Milton | |
| 9,277,362 B2 | 3/2016 | Li | |
| 9,424,751 B2 | 8/2016 | Hodges | |
| 9,507,346 B1 | 11/2016 | Levinson | |
| 9,576,295 B2 | 2/2017 | Volpe | |
| 9,615,202 B2 | 4/2017 | Dal Santo | |
| 9,661,470 B1* | 5/2017 | Du Bois | H04W 4/027 |
| 9,712,486 B2 | 7/2017 | Johnson | |
| 9,712,972 B2* | 7/2017 | Lynch | H04W 4/046 |
| 9,741,191 B1* | 8/2017 | Wong | G06Q 10/06311 |
| 9,774,994 B2* | 9/2017 | Chen | H04W 4/021 |
| 9,792,567 B2 | 10/2017 | Khasis | |
| 9,805,521 B1 | 10/2017 | Davidson | |
| 9,817,948 B2* | 11/2017 | Swank | G06F 19/3418 |
| 9,826,345 B2 | 11/2017 | Haro | |
| 9,838,843 B1* | 12/2017 | Bajaj | H04W 4/022 |
| 9,871,865 B2 | 1/2018 | Shaashua | |
| 9,878,663 B1 | 1/2018 | Kochura | |
| 10,097,960 B2* | 10/2018 | Tung | H04W 4/029 |
| 2004/0193617 A1 | 9/2004 | Adler | |
| 2005/0096009 A1* | 5/2005 | Ackley | H04M 1/663 455/405 |
| 2006/0248121 A1 | 11/2006 | Cacenco et al. | |
| 2007/0143013 A1 | 6/2007 | Breen | |
| 2008/0125965 A1 | 5/2008 | Carani | |
| 2008/0319602 A1* | 12/2008 | McClellan | G07C 5/008 701/31.4 |
| 2009/0079555 A1 | 3/2009 | Aguirre De Carcer et al. | |
| 2009/0019357 A1 | 11/2009 | Cudich | |
| 2009/0275348 A1* | 11/2009 | Weinreich | G01S 5/0036 455/456.3 |
| 2009/0309789 A1* | 12/2009 | Verechtchiagine | G01S 19/42 342/357.33 |
| 2010/0075648 A1* | 3/2010 | Matsuoka | H04M 1/72566 455/418 |
| 2010/0203901 A1* | 8/2010 | Dinoff | H04W 4/022 455/456.3 |
| 2010/0214068 A1* | 8/2010 | Nadkarni | G01S 5/22 340/10.1 |
| 2010/0289644 A1* | 11/2010 | Slavin | G08B 13/2402 340/568.1 |
| 2010/0306735 A1 | 12/2010 | Hoff et al. | |
| 2011/0112768 A1* | 5/2011 | Doyle | G06Q 10/08 701/300 |
| 2011/0126168 A1 | 5/2011 | Ilyayev | |
| 2011/0178811 A1 | 7/2011 | Sheridan | |
| 2011/0202591 A1 | 8/2011 | Reis | |
| 2012/0058764 A1* | 3/2012 | Kang | H04W 60/02 455/435.1 |
| 2012/0330722 A1 | 12/2012 | Volpe et al. | |
| 2013/0066688 A1 | 3/2013 | Pinkus | |
| 2013/0093603 A1 | 4/2013 | Tschirhart | |
| 2013/0212130 A1* | 8/2013 | Rahnanna | G06F 17/30002 707/792 |
| 2013/0267253 A1 | 10/2013 | Case | |
| 2013/0289873 A1 | 10/2013 | Mitchell | |
| 2013/0340305 A1* | 12/2013 | Mobley | A01K 29/005 40/300 |
| 2013/0346336 A1* | 12/2013 | Murphy | G06Q 10/0833 705/333 |
| 2014/0026113 A1 | 1/2014 | Farooqi | |
| 2014/0057648 A1 | 2/2014 | Lyman | |
| 2014/0059695 A1 | 2/2014 | Parecki | |
| 2014/0062695 A1* | 3/2014 | Rosen | G08B 21/18 340/539.13 |
| 2014/0095214 A1 | 4/2014 | Mathe et al. | |
| 2014/0155094 A1 | 6/2014 | Zises | |
| 2014/0215043 A1 | 7/2014 | Ryu et al. | |
| 2014/0226470 A1 | 8/2014 | Kim | |
| 2014/0274115 A1* | 9/2014 | Michalson | H04W 4/029 455/456.1 |
| 2014/0274136 A1* | 9/2014 | Edge | H04W 4/04 455/456.2 |
| 2014/0325048 A1 | 10/2014 | Benchorin | |
| 2014/0325394 A1 | 10/2014 | Hamill | |
| 2014/0351411 A1 | 11/2014 | Woods | |
| 2014/0359552 A1 | 12/2014 | Misra | |
| 2014/0370911 A1* | 12/2014 | Gorgenyi | H04W 52/0251 455/456.1 |
| 2014/0380264 A1 | 12/2014 | Misra et al. | |
| 2015/0012908 A1 | 1/2015 | Farooqi | |
| 2015/0095355 A1* | 4/2015 | Patton | G06F 17/30241 707/754 |
| 2015/0106206 A1 | 4/2015 | Vengroff | |
| 2015/0135163 A1 | 5/2015 | Mun | |
| 2015/0149980 A1 | 5/2015 | Zhong | |
| 2015/0163626 A1* | 6/2015 | Zimmer | H04W 4/90 455/404.2 |
| 2015/0173037 A1* | 6/2015 | Piji | A61B 5/1117 455/456.1 |
| 2015/0181016 A1 | 6/2015 | Jain | |
| 2015/0245189 A1* | 8/2015 | Nalluri | G06Q 50/265 455/404.1 |

(56) References Cited

U.S. PATENT DOCUMENTS

| | | | |
|---|---|---|---|
| 2015/0271033 | A1 | 9/2015 | Srivastava et al. |
| 2015/0278759 | A1 | 10/2015 | Harris |
| 2015/0350843 | A1 | 12/2015 | Jensen et al. |
| 2016/0041833 | A1 | 2/2016 | Standley et al. |
| 2016/0050536 | A1 | 2/2016 | You |
| 2016/0057209 | A1 | 2/2016 | Parikh |
| 2016/0073229 | A1 | 3/2016 | Haro |
| 2016/0103657 | A1 | 4/2016 | Zhang et al. |
| 2016/0116596 | A1* | 4/2016 | Rajala ............... G08B 25/10 342/357.54 |
| 2016/0124742 | A1 | 5/2016 | Rangasamy |
| 2016/0173404 | A1 | 6/2016 | Pouyllau |
| 2016/0284184 | A1 | 9/2016 | Bean et al. |
| 2016/0286355 | A1* | 9/2016 | Shur ............... H04W 4/025 |
| 2016/0357522 | A1 | 12/2016 | Wee |
| 2016/0371553 | A1 | 12/2016 | Farnham, IV |
| 2017/0006135 | A1 | 1/2017 | Siebel |
| 2017/0006419 | A1* | 1/2017 | Rajala ............... H04W 4/021 |
| 2017/0006430 | A1 | 1/2017 | Chao |
| 2017/0349058 | A1 | 12/2017 | Bernier |
| 2018/0049001 | A1 | 2/2018 | Volozh |
| 2018/0199239 | A1 | 7/2018 | Sabater Maroto |

FOREIGN PATENT DOCUMENTS

| | | |
|---|---|---|
| WO | 2015143416 | 9/2015 |
| WO | 2016025495 | 2/2016 |

OTHER PUBLICATIONS

International Search Report and Written Opinion from International Application No. PCT/US16/46923 dated Oct. 27, 2016.

Brouwers et al., Dwelling in the canyons: Dwelling detection in Urban Environments Using GPS, Wi-Fi, and Geolocation, Dec. 14, 2011.

Boukhechba et al.,Hybrid battery-friendly mobile solution for extracting users' visited places, Dec. 31, 2016.

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46924 dated Oct. 28, 2016.

Wikipedia, "Virtual Machine," 2014, pp. 1-9, downloaded from the Wayback Machine Internet Archive at ,<url>:https://web.archive.org/web/20140402003043/https://en.wikipedia.org/wiki/Virtual_machine.

Wikipedia, "Virtual Machine," 2013, pp. 1-11, downloaded from the Wayback Machine Internet Archive at <url>:https://web.archive.org/web/20130402165412/https://en.wikipedia.org/wiki/Wireless_sensor_network.

GeoFencing & Alerts, myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Gerla et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/Design%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.

* cited by examiner

Discovered route with a geo-fence polygon around it.

A set of routes between two locations, and a suggestion of the most optimal route with a calculated geo-fence around it

Figure 10

An example of data structure that is sent to AerCloud.

```
"rule": {
"assumptions": [{"parameter": "speedKmHr", "op": ">", "value": "100"}],
"actionType": "NOTIFY",
"geofence": {
"eventType": "INSIDE",
"areas": {
"type": "FeatureCollection",
"features": [
{
"type": "Feature",
"properties": {
"areaId": "areaId_0"
},
"geometry": {
"type": "Polygon",
"coordinates": [
[-122.39456176757811, 37.97559752809123]
]
},
{
"type": "Feature",
"properties": {
"areaId": "areaId_1",
"radius": "13665.473381915877"
},
"geometry": {
"type": "Point",
"coordinates": [-122.01004028320312, 37.94203148678865]
```

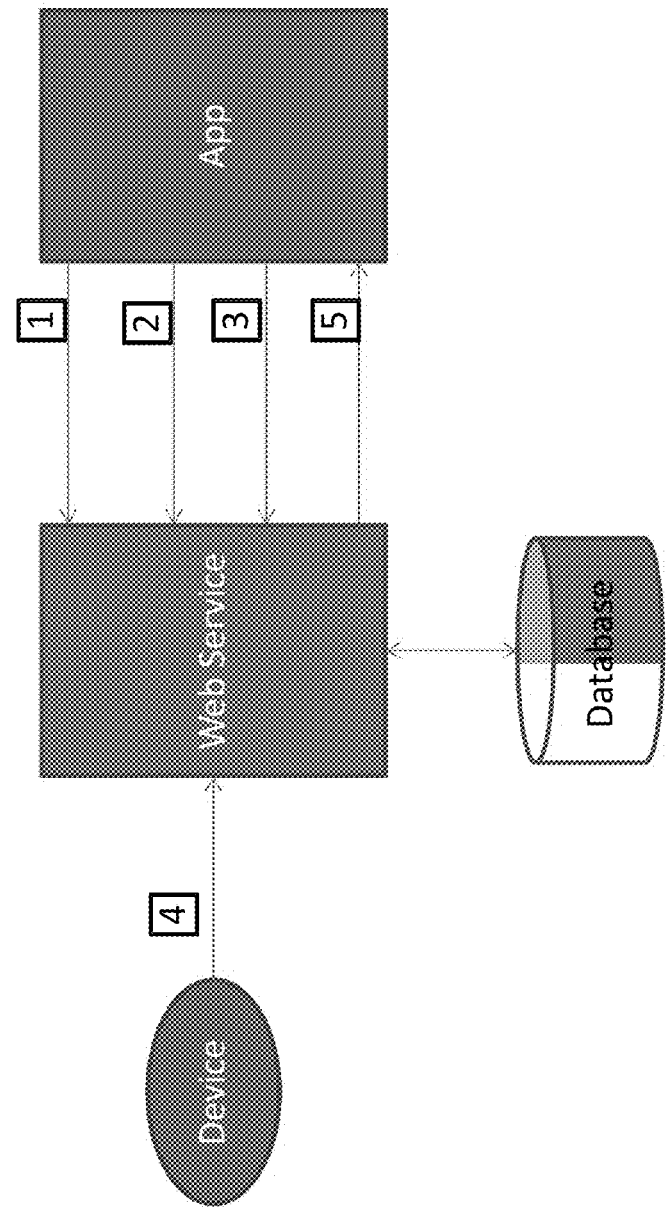

Figure 12
Geofence Configuration

Example:
```
{
    "geofence": {
        "eventType": "INSIDE",
        "areas": {
            "type": "FeatureCollection",
            "features": [
                {
                    "type": "Feature",
                    "properties": {
                        "radius": "1000",
                        "areaId": "1"
                    },
                    "geometry": {
                        "type": "Point",
                        "coordinates": [
                            -121.966842,
                            37.387096
                        ]
                    }
                }
            ]
        }
    }
}
```

- A geofence can contain multiple geographical areas but each area must be a valid GeoJSON object.

| Parameter Name | Description |
|---|---|
| EventType | INSIDE or OUTSIDE |
| Areas | A GeoJSON Feature Collection object. |

- Required GeoJSON Properties
  - "areaId" – is used for notifying INSIDE event type.
  - "radius" - Required if the object type is Point. Its value is the radius of a circle in meters.

Figure 13
Evaluating a Geofence

| Event Type | Trigger Criteria | Trigger |
|---|---|---|
| INSIDE | The geofence rule is "true" if a device location is within any area defined in the fence. "False" otherwise. | Device data is sent to an application only if the geofence rule is evaluated to true. The data is decorated with the "area id" that triggered the fence |
| OUTSIDE | The geofence rule is "true" if a device location is outside all area defined in the fence. "False" otherwise. | Device data is sent to the application only if the geofence rule is evaluated to true. |

Figure 14
User Defined Location Attributes

Normalizing the data model definition using the "metadata" field.

| Parameter Name | Description |
|---|---|
| normalizedProperty | • "LOC_LAT" - indicates that this data model parameter designates latitude. Default is "latitude".<br>• "LOC_LON" - indicates that this data model parameter designates longitude. Default is "longitude".<br>• "LOC_ALT" - indicates that this data model parameter designates altitude. Default is "altitude". |

SYSTEM AND METHOD FOR MONITORING DEVICES RELATIVE TO A LEARNED GEOGRAPHIC AREA

CROSS-REFERENCE TO RELATED APPLICATION

This application is Continuation In Part of U.S. application Ser. No. 15/970,061, filed May 3, 2018, entitled "LEARNING COMMON ROUTES AND AUTOMATIC GEOFENCING IN FLEET MANAGEMENT" which claims priority to U.S. Provisional Application No. 62/523,748, filed Jun. 22, 2017 and is Continuation In Part of U.S. application Ser. No. 15/696,950, filed Sep. 6, 2017; which is a Continuation of U.S. application Ser. No. 15/234,463, filed Aug. 11, 2016; which claims priority to U.S. Provisional Application No. 62/205,639, filed Aug. 14, 2015, which are incorporated herein by reference in their entirety; and is related to U.S. patent application Ser. No. 15/234,493, filed on Aug. 11, 2016, entitled "AERCLOUD APPLICATION EXPRESS AND AERCLOUD APPLICATION EXPRESS LAUNCHER", which is incorporated herein by reference in its entirety.

FIELD OF THE INVENTION

The present invention relates generally to providing a system and method for monitoring devices relative to a learned geographic area using an enablement platform for building web sites and web applications using data storage, management and publication capabilities of hosted web services.

BACKGROUND

With the explosion of the Internet of Things (IoT) and the number of devices connected over internet and wireless communications and generating data for use in user-defined applications, it has become more and more important to enable users to easily build web-based applications that allow use of this generated data for meaningful purposes, such as real time monitoring of and interaction with Machine to Machine (M2M) services devices and services within a communication infrastructure.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time.

Accordingly, what is needed is a system and method to address the issue of real time monitoring of M2M devices. The present invention addresses such a need.

SUMMARY

The present invention relates generally to providing a system and method for monitoring devices relative to a learned geographic area using an enablement platform for building web sites and web applications using data storage, management and publication capabilities of hosted web services. The system and method for monitoring devices relative to a learned geographic area (geofence) are built on existing AerCloud concepts by allowing learned routes to define location attributes and by using the learned location attributes to configure and evaluate geofence parameters and issue alerts if the devices are performing outside the geofence parameters.

BRIEF DESCRIPTION OF THE DRAWINGS

FIG. 10 illustrates an example of data structure that is sent to AerCloud according to an embodiment of the present invention.

FIG. 11 illustrates an example of Geofence workflow according to an embodiment of the present invention.

FIG. 12 illustrates an example of Geofence configuration according to an embodiment of the present invention.

FIG. 13 illustrates an example of criteria for evaluating a Geofence according to an embodiment of the present invention.

FIG. 14 illustrates an example of learned location attributes according to an embodiment of the present invention.

DETAILED DESCRIPTION

Figure 1:
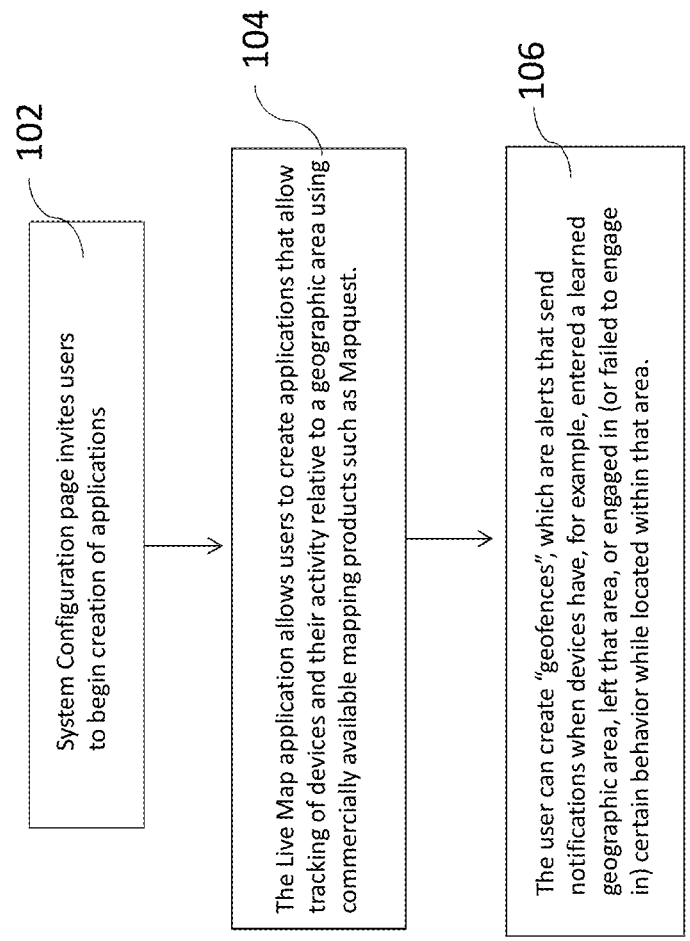
FIG. 1 is a diagram illustrating various steps involved in creating a new instance for development of web sites and web applications and creation of applications using an enablement platform according to an embodiment of the present invention.

The present invention relates generally to providing a system and method monitoring devices relative to learned geographic area using an enablement platform for building web sites and web applications using data storage, management and publication capabilities of hosted web services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Machine to machine (M2M) network communications involves technologies to communicate with other devices often of similar abilities, different from traditional cellular communication networks for instance. In basic M2M environments, a device having limited logic (such as a sensor, meter, etc.) and limited resources (such as computing power) is resident at a location to typically captured measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time. This can be difficult due to limited logic as well as limited resources available to an M2M device.

Although a system and method in accordance with the present invention is described with respect to an application for monitoring devices relative to learned geographic area using an enablement platform for building web sites and web applications using data storage, management and publication capabilities of hosted web services, in M2M domain, as used herein the term "application" is intended to be inclusive, interchangeable, and/or synonymous with other similar applications as described further below, though one will recognize that functionally different types of applications may have characteristics, functions and/or operations which may be specific to their individual capabilities and/or deployment.

The present invention provides a system and method for monitoring devices relative to learned geographic area using an enablement platform which enables setting up new instances by collecting the required information from the user and feeding it to the necessary pages of the Hosted Data Service (HDS) in the background and developing production-ready M2M applications, using data storage, management and publication capabilities of hosted web services by providing easy-to-use software tools or widgets provided on an "out of the box" basis and an Application Programming Interface (API) that interacts with the instance at the HDS.

The enablement platform hereinafter is referred to as AerCloud Application Express (AAE) Launcher and AAE, where AAE Launcher is used with a data management and publication service. Aercloud Application Express (AAE) is an application which is used to create new applications for use of data from M2M devices. This is an application running at a website that uses a simple interface (the Aercloud Application Express User Interface, or AAE UI) to help users who already have an instance at a HDS that can receive device data to develop production-ready M2M applications using easy-to-use software tools (widgets) provided on an "out of the box" basis and an Application Programming Interface (API) that interacts with the instance at the HDS. Once the user has used AAE Launcher to create a new instance for an application using Aeris AerCloud data management and publication service, the user is able to quickly develop production-ready M2M applications using AerCloud API and widgets provided on an "out of the box" basis at the AAE UI using AAE.

One such widget "Geofence" provides a system and method for creating learned geographic area using an enablement platform for building web sites and web applications using data storage and management capabilities of web services. Geofence is built on existing AerCloud concepts by learning location attributes and by using the learned location attributes to automatically configure a geofence and evaluate the geofence as described below.

System Configuration page invites users to begin creation of applications via Aercloud Application Express, first by entering their user credentials for their AerCloud account and, if applicable, a key for incorporating maps provided by commercially available mapping products into applications that use a map. Next, "The Live Map" application widget allows users to create applications that allow tracking of devices and their activity relative to a geographic area using commercially available mapping products.

The embodiments described herein pertain to automatic learning of common routes taken by commercial vehicles as they go around a defined geographic area, whether urban or not, completing their assignments. These routes are then ranked according to distance covered and time taken for the journey, and the optimal time and route for making that journey is ascertained depending on the time of day and day of week. Further, based on the optimal route, an automatic geo-fence around the route is created. The automatic geo-fence thus created may be used in applications that determine that a vehicle has started an assignment that involves a matching starting and destination location and alert the driver if he/she deviates from the expected route. This feature may also be useful to the owner of the commercial fleet who may want to know if the driver is progressing on the designated route according to plan.

This is achieved by creating "geofences", which are alerts that send notifications when devices have, for example, entered a learned geographic area which is used to automatically configure a geofence, left that area, or engaged in (or failed to engage in) certain behavior while located within that area. The invention simplifies the method provided by automatically creating the boundaries of the geofence from learned routes and provides superior flexibility for setting alerts based on device behavior (such as which devices inside the geofence are behaving outside permitted parameters).

Creation and use of this application includes creating a new alert, seeing all the existing alerts, seeing the detail of the alert in a draggable overlay widget. In the draggable overlay widget, the user is permitted to: enter criteria for a new alert, update the selected alert, delete the selected alert and/or enter name of the alert. While doing so, an automatic geofence is created. Drivers of a commercial fleet often go on routes that are similar, which may have common starting and ending points. Over a period of time, this data may be collected and grouped to provide all routes taken by vehicles that started and ended at the same or similar location or within a predefined radius of proximity of a certain location. The data may also be sorted based on different parameters including but not limited to the time of day when the journey started, the day of week when the journey took place etc. Thus, over a period of time, the data regarding common routes taken by vehicles, the total travel time taken for each trip, and the day of week and starting time of trip may be collected and analyzed. It is therefore possible to rank the trips based on journey time for a set distance or the distance covered within a specific period of time. The best time of day and the least time taken for this trip may then be ascertained from the collected data.

This data can be used in the following manner. At the onset of a new journey from a known starting point, the driver could be presented, on a device allowing interaction, possible destination locations, ranked according to degree of confidence (e.g., number of routes started from that location at any time, or number of routes started from that or a nearby location at that time and date). The user would be able to choose one of the suggested destination locations in the graphical user interface. Once the destination location is selected, a lookup is done on the list of routes previously taken by vehicles moving between the same end-points, and the best one in terms of time and distance for a similar day of the week and starting time is chosen as the ideal route. Using an algorithm, an automatic polygon is created around the route with a pre-set margin of separation (e.g., allowing a deviation of up to 100 meters in any direction to allow navigating to avoid obstacles). This polygon is set as the geo-fence for this trip. If the vehicle moves outside this geo-fence polygon, an alert is sent to the driver and owner of the vehicle to warn them of a possible deviation from the allocated route.

Other operations for issuing an alert based on the learned geographic area to automatically configure a "geofence" included in the widget are, for example: 1. See an instruction of what to do while in the geo-fence mode in a green popup. i.e. "Click and drag the mouse on the map to draw a circle"; 2. Remove the geo-fence you have just drawn; 3. Set whether the alert should be executed when the device is inside of the geo-fence or outside of the geo-fence; 4. Set a condition with parameters retrieved from AerCloud; 5. Inline create an existing condition; 6. Inline delete an existing condition.

There are several unique features of this invention. The embodiments described herein involve usage of a computer to determine proximity of an IoT device, which could be a mobile phone or a vehicle equipped with a means for determining location and transmitting data over wireless networks, to a known place among a vast number of such locations on a map. A special kind of encoding called GeoJSON is used to represent such points on a map and a special database is used to handle GeoJSON encoded points on a map. That same encoding can be used in combination with a computer that uses the known data set of map points associated with stored routes, including those labeled in or chosen by the program, using the criteria above, as optimal routes, to create a polygon whose sides rest along or within a defined variance of the chosen route; the polygon is then used by a location monitoring application that can send alerts if actual location of the vehicle strays outside the polygon boundaries. This coding and computer program allow both for very rapid association of specific points on a map with a likely set of matching points without needing to know or look up GPS coordinates, street address or the like, and for rapid and automated creation of "geofence" polygons, in each instance in a far more accurate and less laborious and time consuming manner than trying to make those same associations or to draw and input the geofence boundaries manually. The advantages provided by the embodiments described herein may be listed as follows: (a) it solves a very laborious and commonly occurring problem in the fleet industry, which is that of generating, in a real time, highly automated and low-error way, a tight geo-fence around the route, by employing a simple technique; (b) it provides a standard against which the fleet owner can compare the performance of drivers of his/her fleet; (c) it automatically builds a guideline of trip times between two locations that are commonly visited and provides an optimal time and route for making that journey; (d) the process is automated to improve itself over time as more and more trips are completed; (e) it presents a visual representation of the geo-fence to the operator and also indicates the location where the geo-fence alert was triggered; and (f) knowledge gained from common routes and trip times can be applied for optimizing delivery times, thus resulting in fuel and time savings.

Although the application of this algorithm is explained as relating to commercial fleet, a person skilled in the art may easily understand that it is not limited to commercial fleets and may be used in other applications involving one or more moving machines, including repetitive trips by a single machine.

The learning algorithm in the present invention allows learning to begin to be done in real-time or near real-time using a simple streaming API.

Serving the results in a Software-as-a-Service model requires storing the data in one database but with enough separation between co-existing accounts so that information about devices and behavior of devices belonging to one account is not presented to the owner of a different account. The algorithm in the present invention may process data gathered from devices belonging to multiple accounts together and store it together in a secure manner, which can assist with determining an optimal route for similar trips and setting the corresponding geo-fence, but present the data on a per-account basis that preserves confidentiality. Thus, data gathered from devices belonging to one account is not visible to any other account, however the data from different accounts may be used during the process to create more meaningful and useful results.

To describe the features of the present invention in more detail within the context of monitoring devices relative to a learned geographic area used to automatically configure a "geofence" and for issuing alerts, refer to the accompanying figures in conjunction with the following discussions. These examples are used for purpose of illustration only, and should not be construed as limitations. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a diagram illustrating various steps involved in creation of application using an enablement platform according to an embodiment of the present invention. First, a user signs in Aercloud Application Express (AAE) using a valid user name and password via step 102. System Configuration page then invites the user to begin creation of applications. The Live Map application allows users to create applications that allow tracking of devices and their activity relative to a geographic area using commercially available mapping products via step 104. The user can then create "geofences" via step 106, which are alerts that send notifications when devices have, for example, entered a learned geographic area used to automatically configure a geofence, left that area, or engaged in (or failed to engage in) certain behavior while located within that area. The system and method for monitoring devices relative to a learned geographic area (geofence) are built on existing AerCloud concepts by allowing learned routes to define location attributes and by using the learned location attributes to configure and evaluate geofence parameters and issue alerts if the devices are performing outside the geofence parameters.

Figure 2:
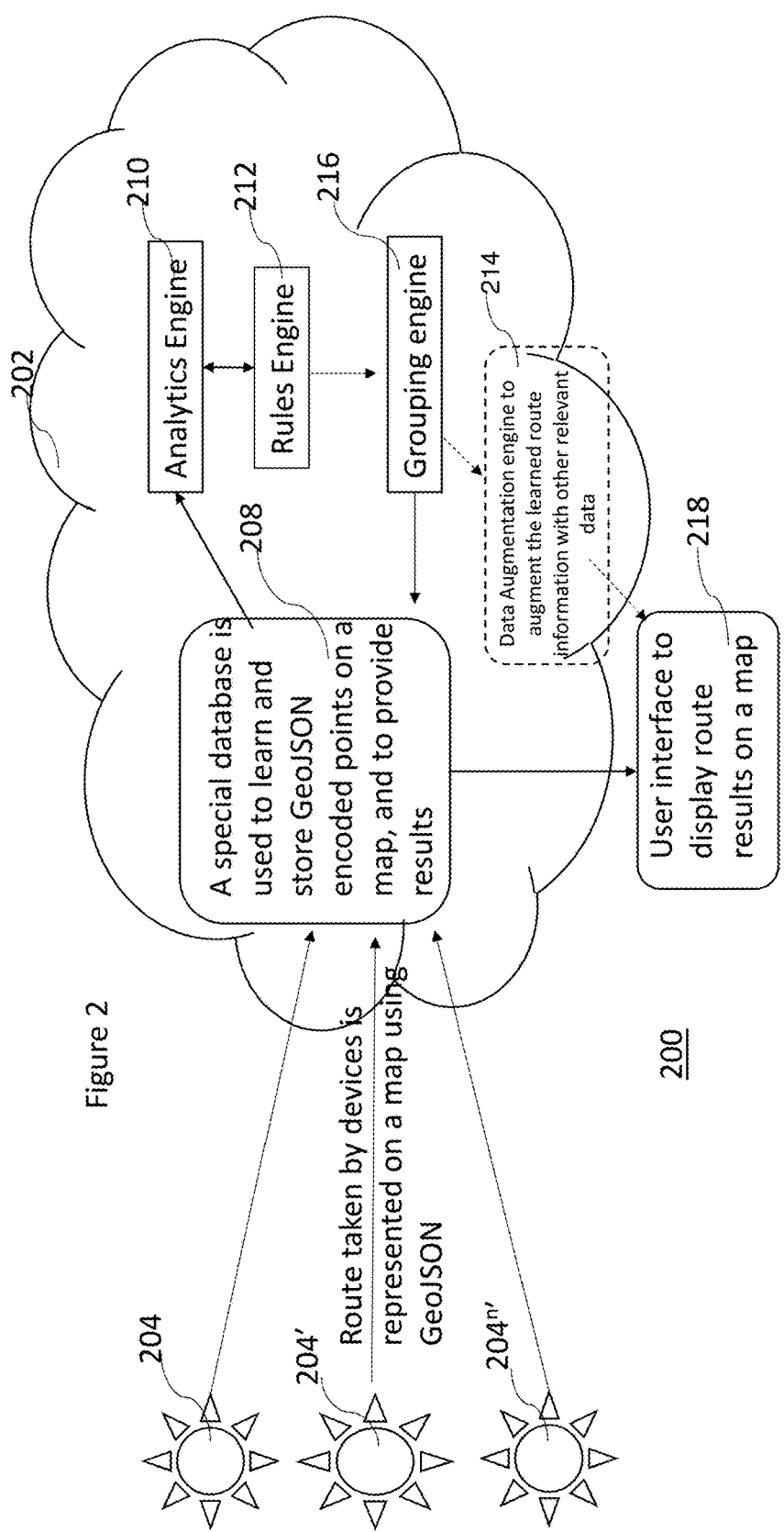
FIG. 2 is an overview diagram for the method and system for learning routes using IoT devices according to an embodiment described herein.

FIG. 2 is an overview diagram for the method and system for learning routes taken by IoT devices according to an embodiment described herein. The system 200 for providing a geo-fence includes one or more mobile devices 204, 204', 204''', a user interface 218 and a data processing system 202, wherein the data processing system 202 further includes a learning database 208, wherein the learning database 208 collects and stores route information for the one or more mobile devices 204, 204', 204'''; and an analytics engine 210, wherein the analytics engine 210 analyzes the route information of the one or more mobile devices 204, 204', 204'' to determine an optimum route, and creates the geo-fence around a route to be monitored based on the route information for the optimum route.

As described herein, the system 200 includes devices 204, 204', . . . 204''', a data processing system 202, including a learning or storage database 208, an analytics engine 210, a rules engine 212, clustering or grouping engine 216, and a user interface 218. Additionally, a data augmentation engine 214 may also be included to augment the learned route information with other relevant data, e.g., address.

The mobile devices 204, 204', . . . 204''' may include communication devices, for example, vehicles connected to the cellular network or cellular-enabled devices via SIMs that are installed in the communication devices either integrated in the vehicle itself or removably installed in the vehicle on each of the fleet vehicles. These communication devices may transmit relevant vehicle data, including identity of the device and/or location of the device, to storage database 208 and/or the data processing system 202 of the monitoring system using a wireless communication technology, for example, a radio module or WiFi etc. In an embodiment, the device data may also be received from network elements.

The system configuration 200 may include an instance of a client application with a user interface 218 hosted thereon, for example, a desktop fleet application provided through a web-based portal used by the fleet manager to manage fleet vehicles, and/or fleet application operating on mobile devices, such as smartphones, used by the fleet manager to manage fleet vehicles or by vehicle drivers to access the information on the go, anywhere, any time.

The learning or storage database 208 may be a special database which is used to learn and store GeoJSON encoded points on a map, including both starting and ending locations and points traveled along a route, and to analyze the data and provide results to users, such as, for example, through a service offered by a provider of asset tracking services using cloud computing. The data is gathered by the learning or storage database 208. For example, the system involves usage of a computer to determine proximity to a known place among a vast number of such locations on a map. A special kind of encoding called GeoJSON may be used to represent such points on a map. A special database may be used to handle GeoJSON encoded points on a map, and to provide results in an efficient manner when requesting to display it on a map.

The gathered data may include route information along with the device records, for example, device identifier, start location of the route, destination location for the route, time of the day for the travel, day of the week for the travel, time taken for or duration of the travel, distance covered during the travel, etc. Thus, over a period of time, the data regarding common routes taken by vehicles, the total travel time taken for each trip, the day of week and starting time of trip may be collected and analyzed. It is therefore possible to rank the trips based on journey time for a set distance and/or the distance covered within a specific period of time. The best time of day and the least time taken for this trip is then be ascertained from the collected data and an automatic geo-fence is created using the gathered data.

The algorithm used by the analytics engine 210 to create an automatic geo-fence may first scan through the device records and choose a set of points from a previous trip along the same route, also called as a discovery process. The points are then sampled such that they are as equally spaced as possible. This is done either with respect to time, distance or a combination of distance and time as desired. These sampled coordinates form the control points for a Non-Uniform Rational cubic B-spline (NURB) that approximates the route and a parameterized curve results from the above operation.

Figure 3A:
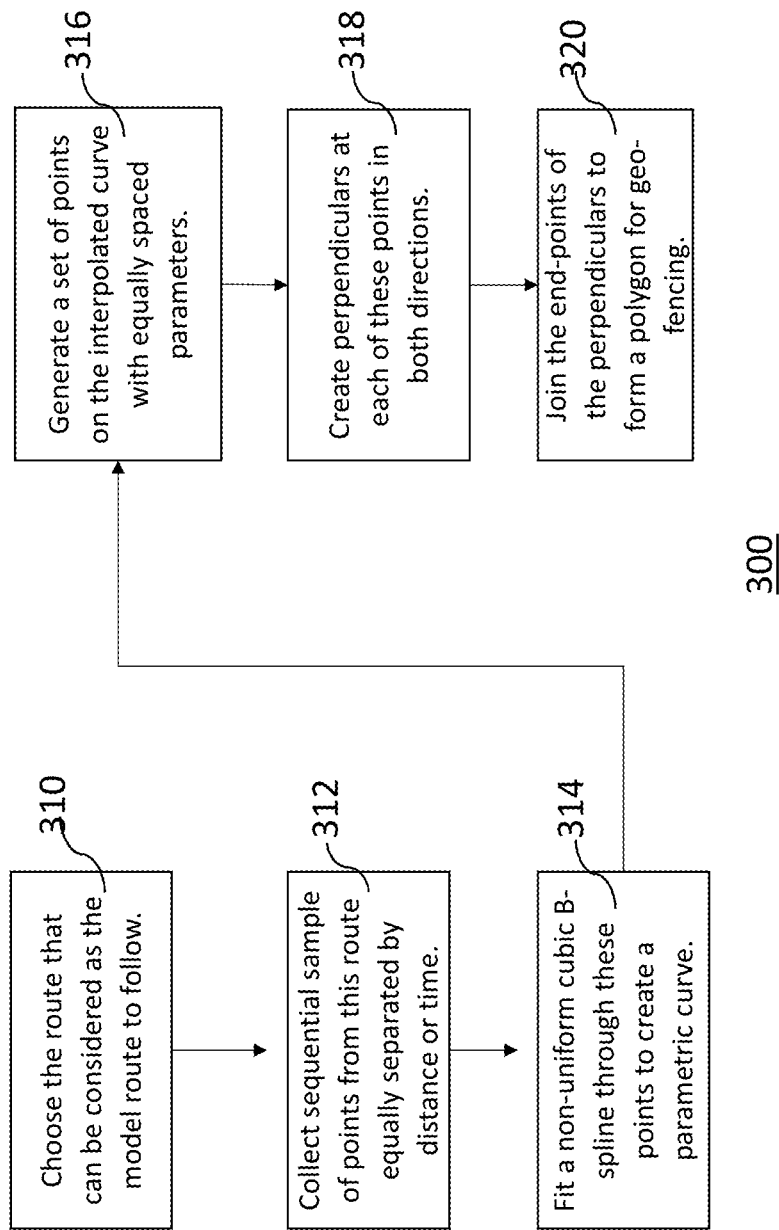
FIG. 3A illustrates an exemplary process for creating a geo-fence according to an embodiment described herein.
Figure 3B:
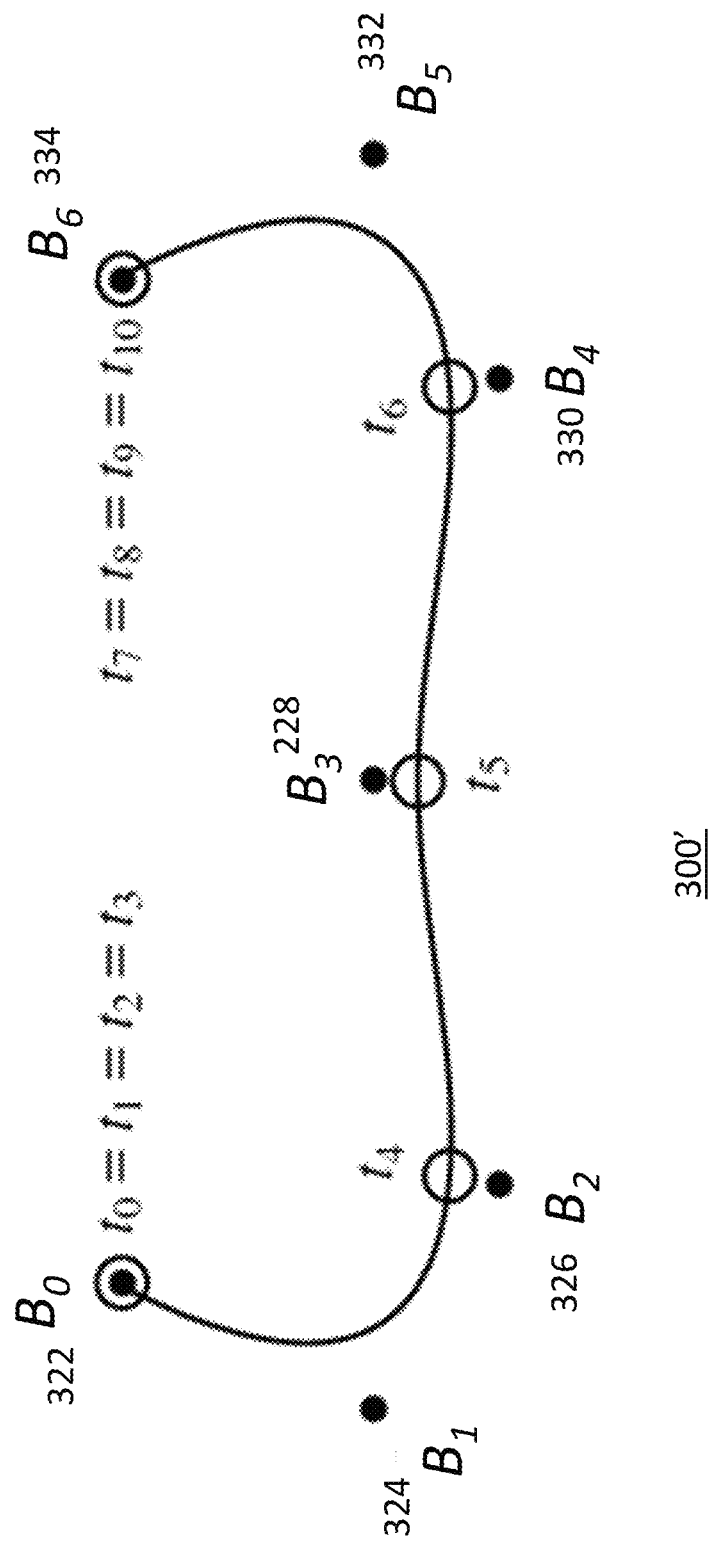
FIG. 3B illustrates an exemplary process for creating a geo-fence according to an embodiment described herein.

The above operation may be considered a mapping of points from Cartesian space to parametric space with parameter 't'. For example, uniformly separated parameterized points ranging from t=0 to t=1 with a predetermined interval, e.g., an interval of 0.01 are then calculated along the curve to act as anchor points for perpendiculars along the curve. The exemplary process is depicted in FIG. 3B and described in detail in the description accompanying FIG. 3B.

Figure 3C:
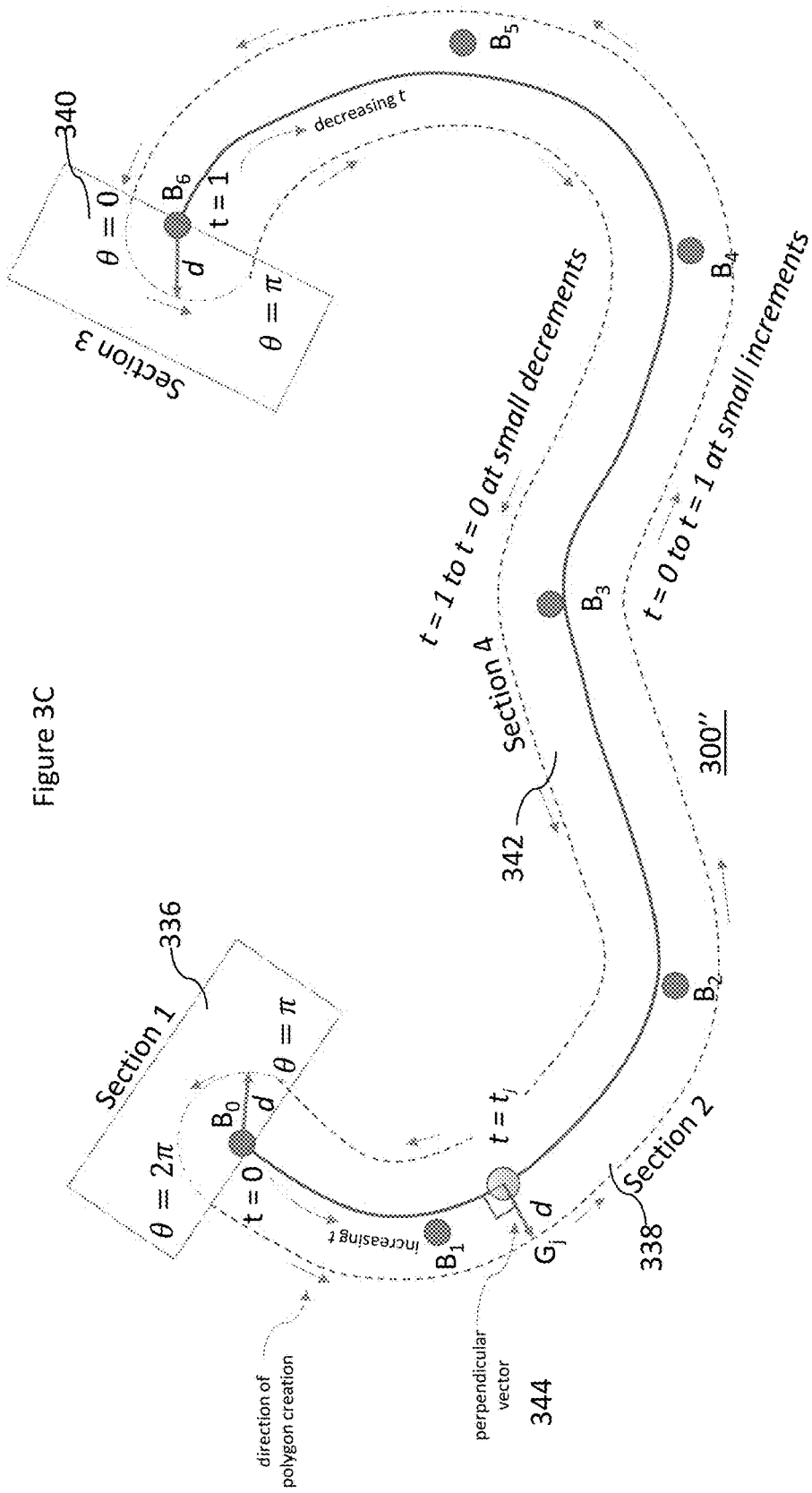
FIG. 3C illustrates an exemplary process for creating a geo-fence according to an embodiment described herein.

In an exemplary embodiment, the polygon geo-fence comprises of four different sections as depicted in FIG. 3C and described in detail in the description accompanying FIG. 3C. Two points along each perpendicular are calculated on either direction which are at a pre-set distance, e.g., 0.25 kilometers, 1 kilometer etc. from the route. The end-points of the perpendiculars are joined sequentially in sequence to create the polygon that becomes the geo-fence created for the route to be monitored. This process of creating a geo-fence using system 200 is illustrated in FIGS. 3A, 3B and 3C and described in detail in the description accompanying FIGS. 3A, 3B and 3C.

The rules engine 212 of the data processing system 202 may determine proximity of the destination location already in the database to the actual and/or entered destination location by using a radius of proximity that may be defined by the user or provided to the system. If actual and/or entered destination location is within the radius of proximity of the destination location already in the database, it is assumed that the actual and/or entered destination location and the destination location already in the database are the same, and that destination location is suggested for the new journey. Otherwise, the actual and/or entered destination location is treated as a new actual destination location and is added to the learning database 208.

The algorithm may be designed to work within the SaaS (Software as a Service) model where one physical database may be maintained for collecting and storing data related to all accounts and that data used on an aggregate basis to assist the rules engine 212 in learning routes and determining optimal time and route for making that journey, but actual data of devices identified to each account is stored in a secure manner and kept separate for each account and processed and displayed exclusively for that account within the database to preserve confidentiality.

The process of discovery may be triggered by using a script that runs at periodic intervals, for example, once a day, once a week etc. An alternate way to trigger the discovery process may be through a streaming API that analyzes a trip as soon as it ends and stores the start and stop-locations for the trip. Alternatively, the discovery process may be defined as an ongoing process, collecting device data in near-real time.

The discovered routes may then be clustered or grouped by the clustering/grouping engine 216 of the data processing system 202 to form bigger groups based on start location and end location. For example, start and end locations for a route detected by the system, within a predefined radius of proximity, e.g., 1 mile, from a known start and end location, may be grouped together as a cluster or group. Several such collections or clusters with different radii of separation—all of which may be derived from the base collection, may be stored in database 208. The trips are then ranked by using different parameters including total travel time taken to complete a trip, distance covered by the trip or a combination thereof and presented to the user via user interface 218.

Figure 4:
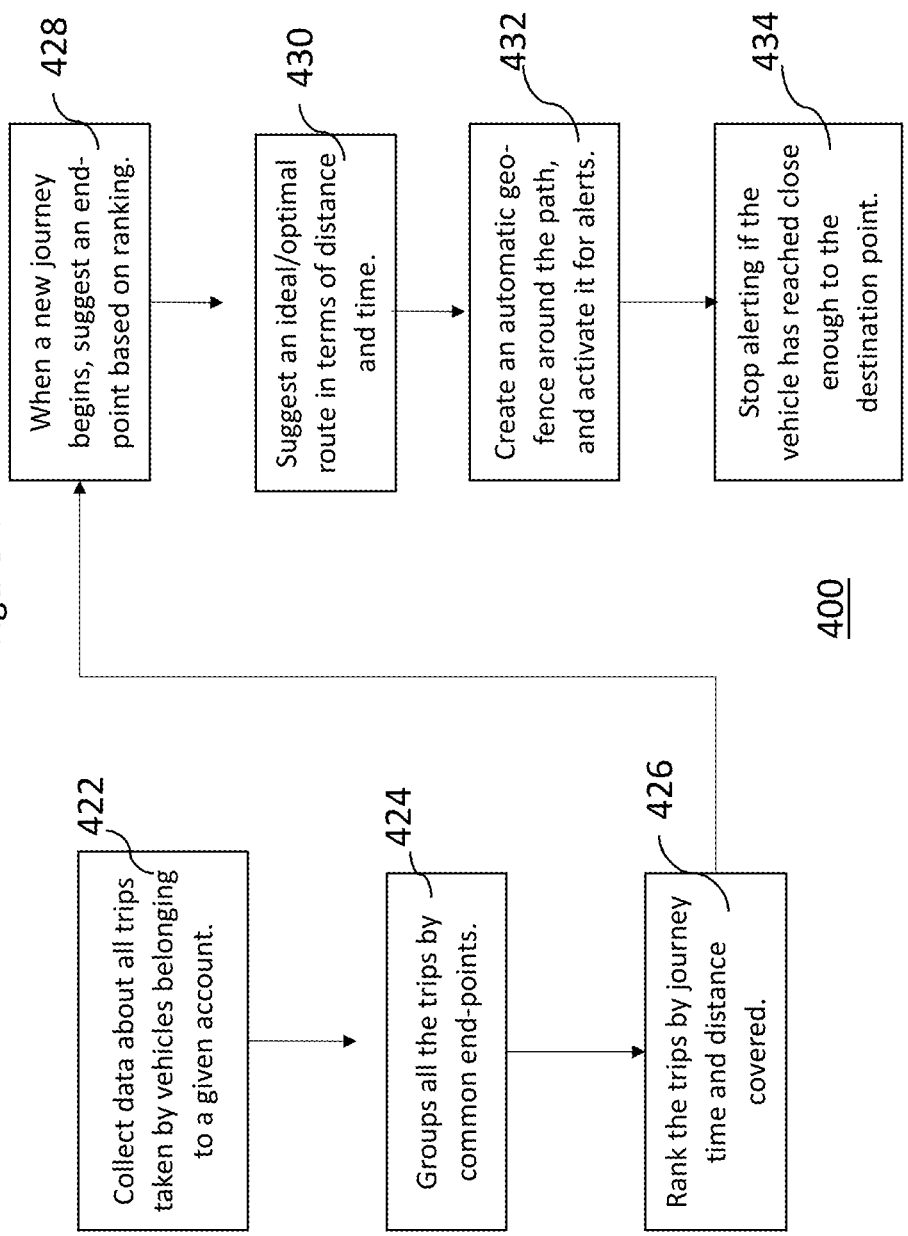
FIG. 4 illustrates an exemplary process for providing the created geo-fence to an application according to an embodiment described herein.

At the onset of a new journey from a known starting point, the user interface may present a list of possible destination locations ranked according to degree of confidence (e.g., number of routes started from that exact location at any time, or number of routes started from that or a nearby location at that time and date) and allows the user to choose one of the suggested destination locations in the graphical user interface 118 as route selection. Once the destination location is selected, the system looks up a list of routes previously taken by vehicles moving between the same end-points, and the best one in terms of time and distance is chosen as the ideal route and/or for a similar day of the week and starting time. Using an algorithm illustrated in FIGS. 3A, 3B and 3C, an automatic polygon is created around the route with a pre-set margin of separation (e.g., allowing a deviation of up to 100 meters in any direction to allow navigating to avoid obstacles). This polygon is set as the geo-fence for this trip and may be used by different applications for creating alerts. For example, if the vehicle moves outside this geo-fence polygon, an alert is sent to the driver and owner of the vehicle to warn them of a possible deviation from the allocated route. Once the vehicle reaches the destination or is close enough to the destination point, the system stops sending alerts. The process for providing the created geo-fence using system 200 is illustrated in FIG. 4.

FIG. 3A illustrates an exemplary process for creating a geo-fence using system 200 according to an embodiment described herein. The computer-implemented method for creating a geo-fence around a route includes collecting and storing route information for one or more mobile devices; analyzing the route information for the one or more mobile devices to determine optimal time and route for making that journey; and creating the geo-fence around a route to be monitored based on the route information for the optimum route. Creating the geo-fence around a route to be monitored further includes choosing a set of points along the route to be monitored; sampling at least two points from the set of points to form a parameterized curve; calculating parameterized points along the parameterized curve to act as anchor points for perpendiculars along the curve; calculating two points along each perpendicular at a predetermined distance from the route on either direction; and joining end points of the perpendiculars sequentially to form a polygon creating the automatic geo-fence for the route to be monitored.

The algorithm to create an automatic geo-fence around a route to be monitored works as follows. First a set of points from a previous trip along the same route is chosen via step 310. This is then sampled such that they are as equally spaced as possible via step 312. This is done either with respect to time, distance or a combination of distance and time as desired. These sampled coordinates form the control points for a non-uniform rational cubic B-spline that approximates the route and a parameterized curve results from the above operation via step 314. Uniformly separated parameterized points are then calculated along the curve via step 316 to act as anchor points for perpendiculars along the curve. Two points along each perpendicular are calculated on either direction which are at a pre-set distance from the route via step 318. Finally, the end-points of the perpendiculars are joined sequentially to create the polygon that becomes the automatic geo-fence for the route via step 320.

For example, once a first a set of points from a previous trip along the same route is chosen via step 310, it is then sampled such that they are as equally spaced as possible via step 312. This is done either with respect to time, distance or a combination of distance and time as desired. These sampled coordinates form the control points for a Non-Uniform Rational cubic B-spline (NURB) that approximates the route and a parameterized curve results from the above operation via step 314. An exemplary curve fitting using cubic B-spline, where $B_1$-$B_6$ are control points and $t_1$-$t_6$ are parameters along the curve is depicted by FIG. 3B and described in detail in the description accompanying FIG. 3B.

Uniformly separated parameterized points are then calculated along the curve via step 316 to act as anchor points for perpendiculars along the curve. Two points along each perpendicular are calculated on either direction which are at a pre-set distance, e.g., 0.25 kilometers, 1 kilometer etc. from the route via step 318. Finally, the end-points of the perpendiculars are joined in sequence to create the polygon via step 320 that becomes the automatic geo-fence created for the route to be monitored. An exemplary process for creating a geofence is depicted by FIG. 3C and described in detail in the description accompanying FIG. 3C.

FIG. 3B illustrates an exemplary curve fitting process using the algorithm illustrated by step 314 in FIG. 3A and described in the description accompanying FIG. 3A. In an exemplary curve fitting using cubic B-spline, $B_1$-$B_6$ (322-334) are control points and $t_1$-$t_6$ are parameters along the curve 300'. FIG. 3B illustrates a simplified scenario for a curve 300' with 7 control points ($B_0$ 322, $B_1$ 324, ..., $B_6$ 334), the solid line represents a cubic B-spline fitted through these points based on the formula given below. Points along this curve are then calculated based on the parameter 't' which takes equally separated discrete values $t_0$, $t_1$, $t_2$, ..., $t_{10}$.

This B spline curve 300' is defined by the equation:

$$Q(t) = \frac{\sum_{i=1}^{n} w_i B_i N_{i,k}(t)}{\sum_{i=1}^{n} w_i N_{i,k}(t)}$$

where $w_i$=scalar weight for each control point, $B_i$=control points, $N_{i,k}(t)$=the B-Spline curve and k=B-spline parameter. The curve defined by $Q_{(t)}$ is a B-spline. Since a cubic B-spline is used in this implementation, k is equal to 3 and weight $w_i$ is equal to 1. The curve defined by $Q_{(t)}$ is a B-spline. Since a cubic B-spline is used in this implementation, k or order of the curve, is equal to 3 and weight $w_i$ is equal to 1. Another parameter along the curve is t, where $t_i \in [0,1]$ in increments, for example, 0.01. Device location points are used as control points $B_0, B_1, \ldots, B_n$, with degree of separation p≡m−n−1.

An exemplary curve fitting using cubic B-spline, where $B_1$-$B_6$ (322-334) are control points and $t_1$-$t_6$ are parameters along the curve is described herein. The curve defining B-spline 300' can be calculated as follows:

The basis function is defined as:

$$N_{i,0}(t) = \begin{cases} 1 & \text{if } t_i \leq t < t_{i+1} \text{ and } t_i < t_{i+1} \\ 0 & \text{otherwise} \end{cases}$$

$$N_{i,j}(t) = \frac{t - t_i}{t_{i+j} - t_i} N_{i,j-1}(t) + \frac{t_{i+j+1} - t}{t_{i+j+1} - t_i} N_{i+1,j-1}(t)$$

where j=1, 2, ..., k; and the curve B-spline is defined as:

$$Q(t) = \sum_{i=1}^{n} B_i N_{i,k}(t)$$

The above operation may be considered a mapping of points from Cartesian space to parametric space with parameter 't'. For example, uniformly separated parameterized points ranging from t=0 to t=1 with a predetermined interval, e.g., an interval of 0.01 are then calculated along the curve to act as anchor points for perpendiculars along the curve.

FIG. 3C shows the same simplified scenario as FIG. 3B and illustrates how the geo-fence is created around the B-spline using the algorithm illustrated by steps 316, 318 and 320 in FIG. 3A and described in the description accompanying FIG. 3A. The geo-fence is divided into four parts: (i) Section 1 336: Semi-circular section of radius 'd' around point $B_0$, (ii) Section 2 338: A curve hugging the B-Spline on the right side at a distance 'd', (iii) Section 3 340: A semi-circle of radius 'd' around the last control point $B_6$ (in this case) and (iv) Section 4 342: A curve hugging the B-Spline on the left side at a distance of 'd'. The detailed description of how these curves are created is described below.

The polygon geo-fence comprises of four different sections as depicted in FIG. 3C. As shown by step 316 of FIG. 3A, uniformly separated parameterized points are then calculated along the curve to act as anchor points for perpendiculars along the curve as follows. Section 1 336 is a semi-circle calculated with a value of θ=π to θ=2π with a radius of the separation d from the route (e.g. 0.25 kilometers, 1 kilometer) and with increment angle Δθ of (e.g.) 5 degrees.

As illustrated by step 318 of FIG. 3A, two points along each perpendicular are calculated on either direction which are at a pre-set distance, e.g., 0.25 kilometers, 1 kilometer etc. from the route as follows. Section 2 338 of the geo-fence is a curve along the right side of the parametric route starting from $t_j$=0 to $t_j$=1 at equal increments of Δt (e.g. 0.01). At each $t_j$ a perpendicular vector is constructed with respect to the direction of movement of t and a point $G_j$ at a distance of d is created. Section 3 340 is again a semi-circle with θ=0 to θ=π with same radius of the separation d from the route and with increment angle Δθ of (e.g.) 5 degrees. Section 4 342 of the geo-fence is a curve along the right side of the parametric route starting from $t_j$=1 to $t_j$=0 at equal decrements of Δt (e.g. 0.01). At each $t_j$ a perpendicular vector 344 is constructed with respect to the direction of movement of t and a point $G_j$ at a distance of d is created. This point happens to lie on the other side of the curve since the direction of movement is reversed from Section 2 338.

As illustrated by step 320 of FIG. 3A, the end-points of the perpendiculars are joined in sequence to create the polygon that becomes the automatic geo-fence created for the route to be monitored. Joining all the points sequentially from Section 1 336, Section 2 338, Section 3 340 and Section 4 342 gives rise to the complete geo-fence polygon created for the route to be monitored.

FIG. 4 illustrates an exemplary process for providing the geo-fence created as illustrated in FIGS. 3A, 3B and 3C to an application according to an embodiment described herein. The analytics system collects data about all trips taken by vehicles belonging to a given account via step 422. The collected data is grouped by common end-points for trips for which the data is collected via step 424. The trips are the ranked by using different parameters including time taken to complete a trip, distance covered by a trip or a combination thereof via step 426.

At the onset of a new journey from a known starting point, the user interface may present a list of possible destination locations ranked according to degree of confidence (e.g., number of routes started from that exact location at any time, or number of routes started from that or a nearby location at that time and date) via step 428 and allows the user to choose one of the suggested destination locations in the graphical user interface via step 430 as route selection. Once the destination location is selected, the system looks up a list of routes previously taken by vehicles moving between the same end-points, and the best one in terms of time and distance and/or for a similar day of the week and starting time is chosen as the ideal route via step 430. Using an algorithm illustrated in FIGS. 3A and 3B, an automatic polygon is created around the route with a pre-set margin of separation (e.g., allowing a deviation of up to 100 meters in any direction to allow navigating to avoid obstacles) via step 432. This polygon is set as the geo-fence for this trip. If the vehicle moves outside this geo-fence polygon, an alert is sent to the driver and owner of the vehicle to warn them of a possible deviation from the allocated route. Once the vehicle reaches the destination or is close enough to the destination point, the system stops sending alerts via step 434.

Figure 5A:
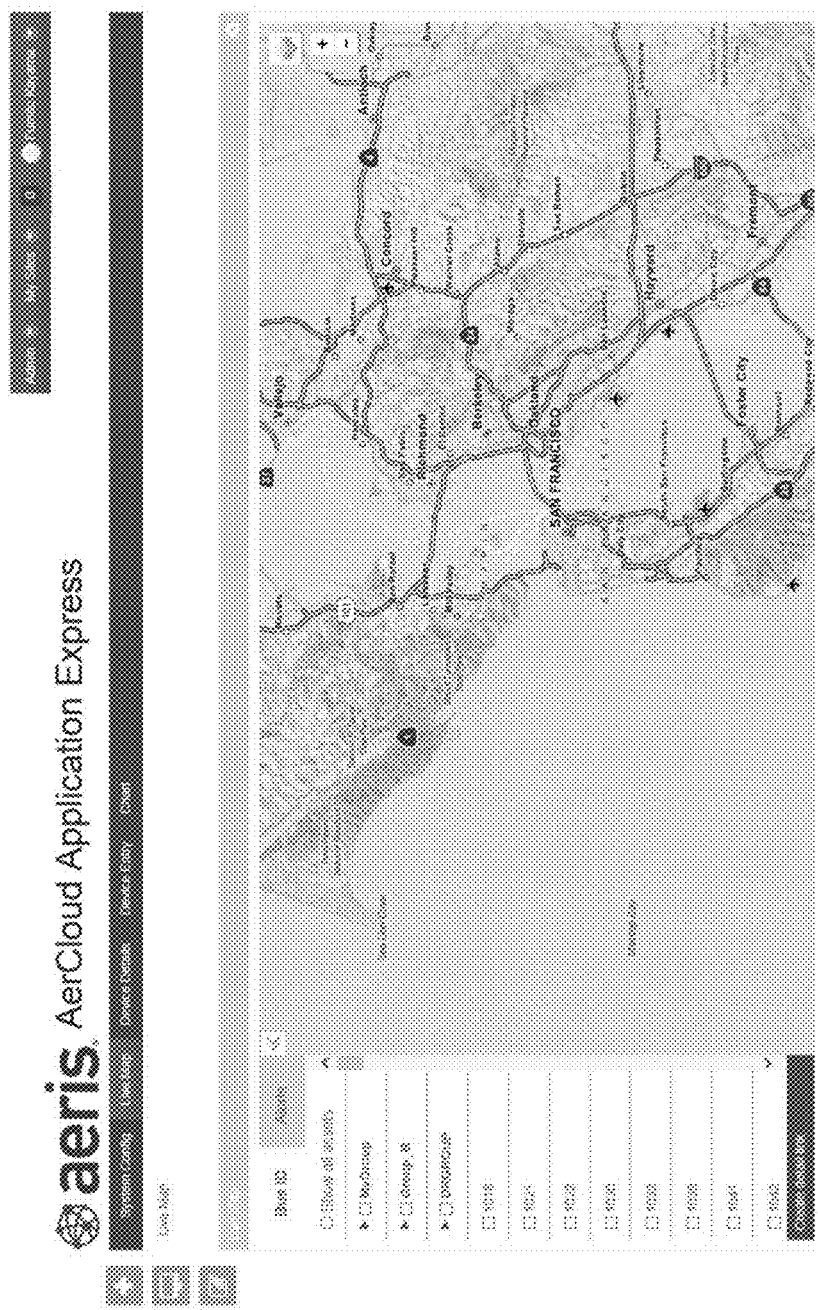
FIG. 5A is a diagram illustrating "Live Map", a widget provided by Application Express allowing users to create applications for tracking of devices and their activity relative to a geographic area using commercially available mapping products according to an embodiment of the present invention.

FIG. 5A is a diagram illustrating "Live Map", a widget provided by Application Express allowing users to create applications for tracking of devices and their activity relative to a geographic area using commercially available mapping products according to an embodiment of the present invention.

Figure 5B:
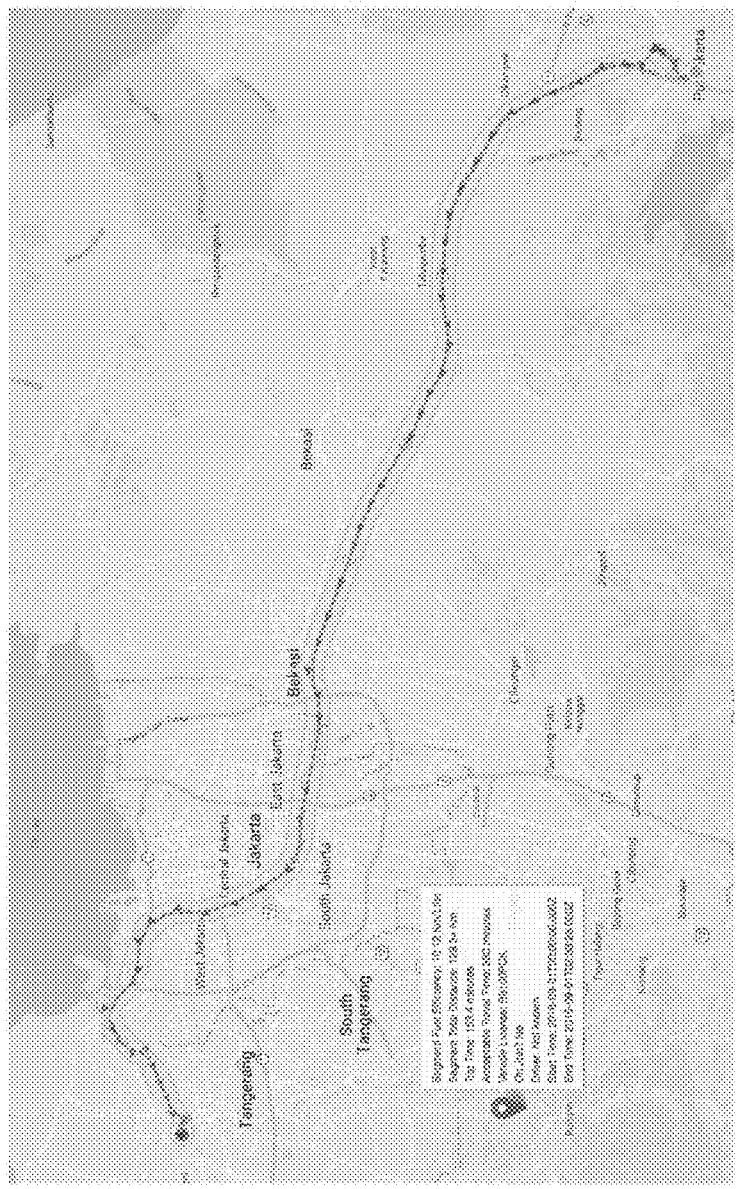
FIG. 5B is a diagram illustrating a discovered route with a geo-fence polygon around it according to an embodiment of the present invention.

FIG. 5B depicts an additional or alternate embodiment illustrating an exemplary user interface for viewing a discovered route with a geo-fence polygon around it as illustrated in FIGS. 2, 3A, 3B, 3C and 4 and described in detail in the description accompanying those figures according to an embodiment of the present invention.

FIG. 5B illustrates an exemplary screen shot 500 showing a discovered segment including any one or more parameters such as fuel efficiency for that segment, total distance of the segment, time taken to travel that segment, acceptable travel time for that segment derived from data analysis of other trips on that segment, other information related to the device, start time and end time of the journey etc. The route shown herein has been broken into predetermined or desired number parts, e.g., 1000 parts, along the parameter t that traverses along the length of the route, with perpendiculars plotted with a pre-set margin, e.g., a margin of 1 Km away from route shown as the shaded region around the path.

Figure 5C:
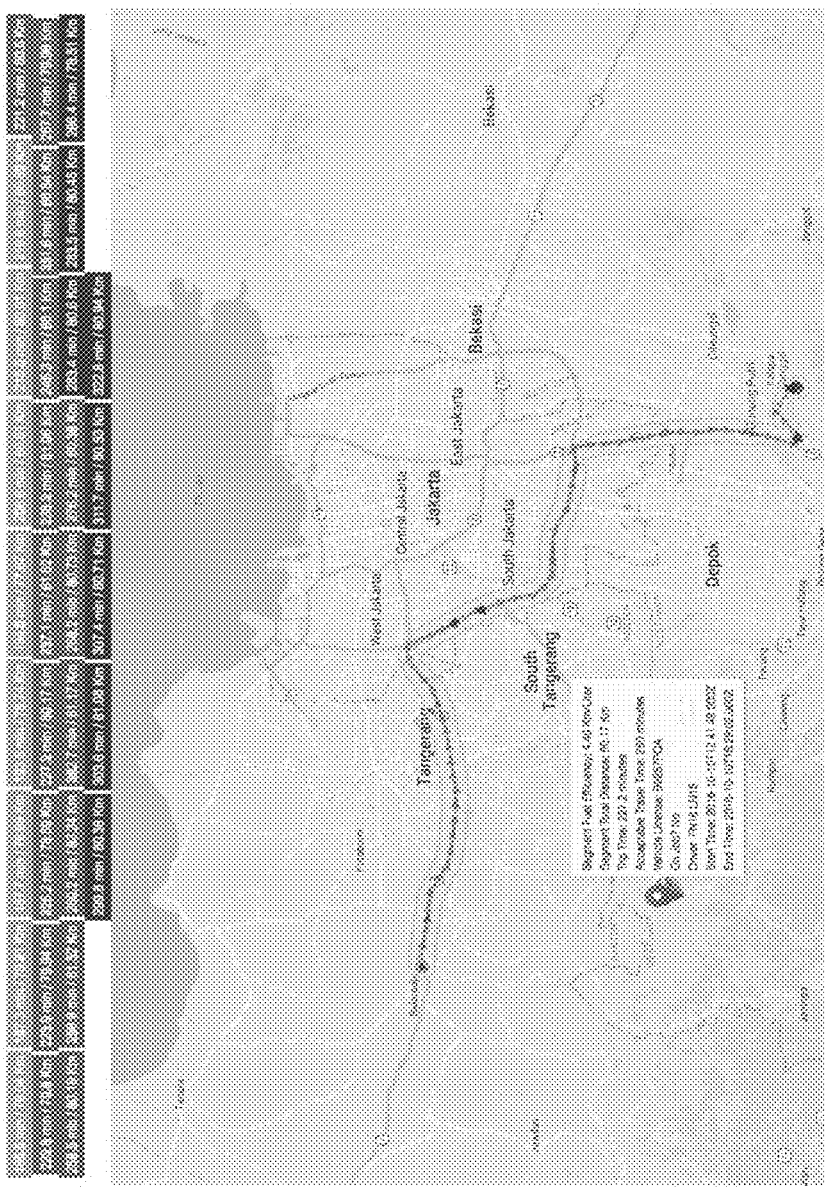
FIG. 5C is a diagram illustrating a set of routes between two locations, and a suggestion of the most optimal route with a calculated geo-fence around it according to an embodiment of the present invention.

FIG. 5C is a diagram illustrating a set of routes between two locations, and a suggestion of the most optimal route with a calculated geo-fence around it according to an embodiment of the present invention. FIG. 5C illustrates an exemplary screen shot 500" showing a set of routes between two locations, and a suggestion of the most optimal route with a calculated geo-fence around it. For example, as shown in FIG. 5C, the data may be sorted based on parameters such as time taken to travel a particular route, ranked in order from fastest to slowest. The other parameters that may be displayed may include any one or more of: the time of day when the journey started, the day of week when the journey took place etc. Thus, over a period of time, the data regarding common routes taken by vehicles, e.g., the total travel time taken for each trip, and the day of week and starting time of trip may be collected and analyzed. It is therefore possible to rank the trips based on journey time for a set distance and/or the distance covered within a specific period of time. The best time of day and the least time taken for this trip may then be ascertained from the collected data and may be used for planning future trips.

Figure 6:
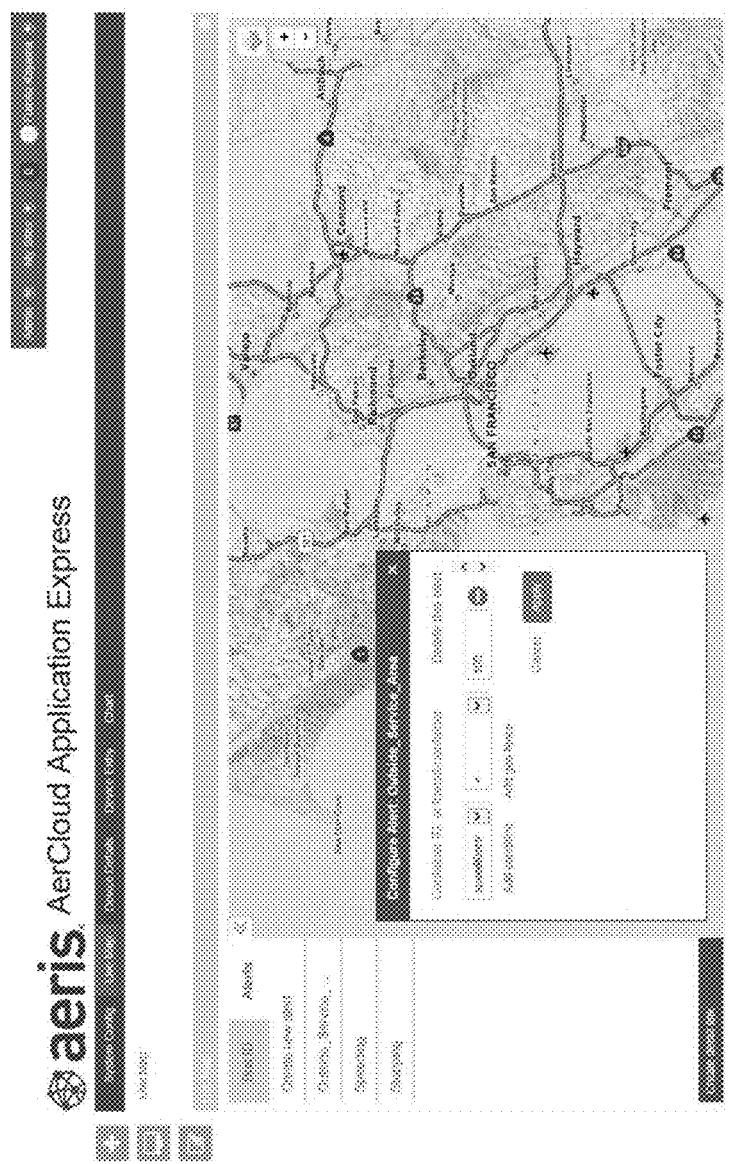
FIG. 6 is a diagram illustrating "Live Map", a widget provided by Application Express allowing users to configure alerts according to an embodiment of the present invention.

FIG. 6 is a diagram illustrating "Live Map", a widget provided by Application Express allowing users to configure alerts according to an embodiment of the present invention.

Figure 7:
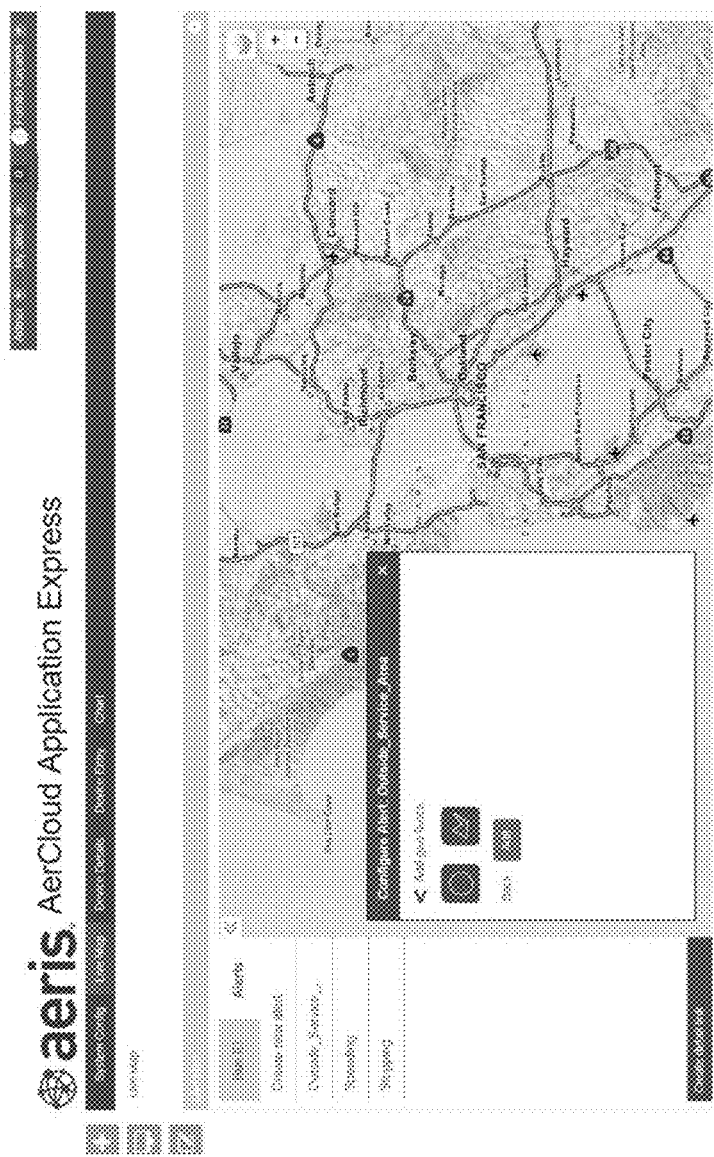
FIG. 7 is a diagram illustrating "Live Map", a widget provided by Application Express allowing users to configure alerts by adding "geofence" according to an embodiment of the present invention.

FIG. 7 is a diagram illustrating "Live Map", a widget provided by Application Express allowing users to configure alerts by adding "geofence" according to an embodiment of the present invention.

Figure 8:
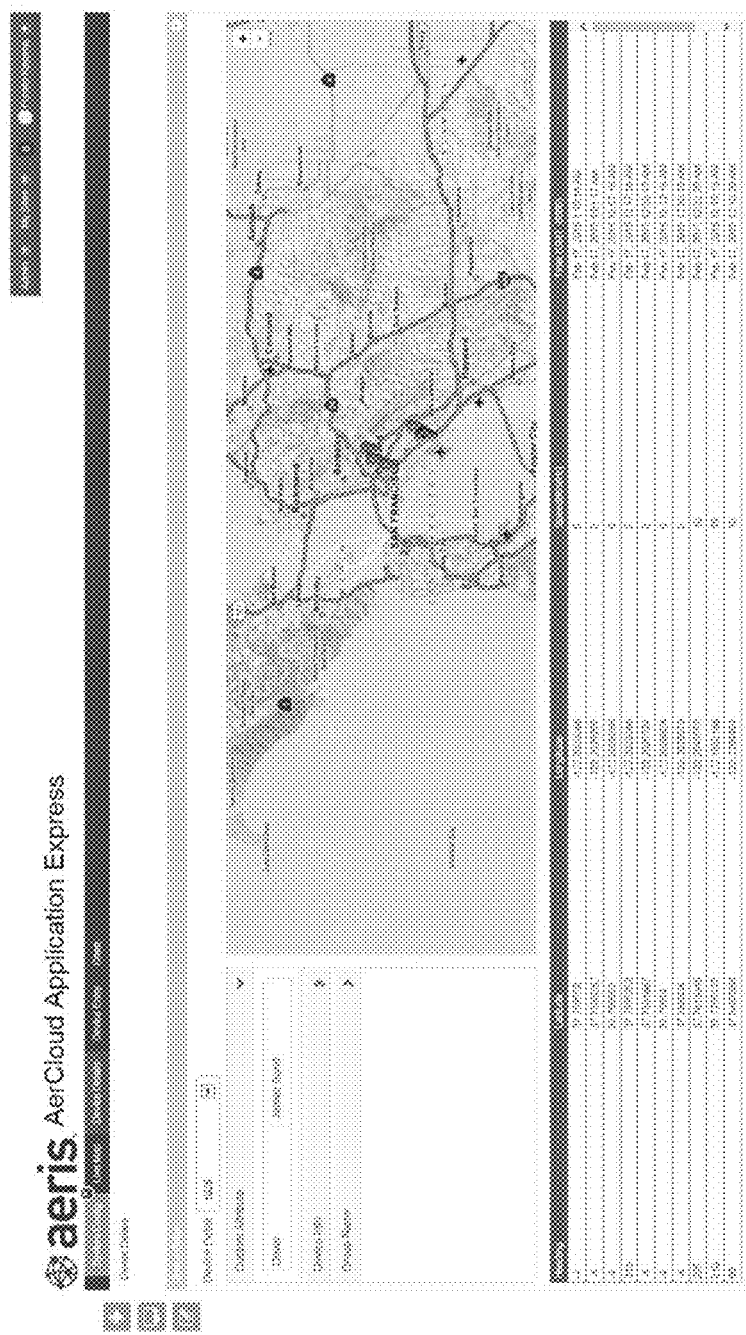
FIG. 8 is a diagram illustrating "Device Entry" a widget provided by Application Express and its interaction with "Device Details" widget illustrating types of location data returned by the Live Map and "Chart" application widgets according to an embodiment of the present invention.

FIG. 8 is a diagram illustrating "Device Entry" a widget provided by Application Express and its interaction with "Device Details" widget illustrating types of location data returned by the Live Map and "Chart" application widgets according to an embodiment of the present invention.

Figure 9:
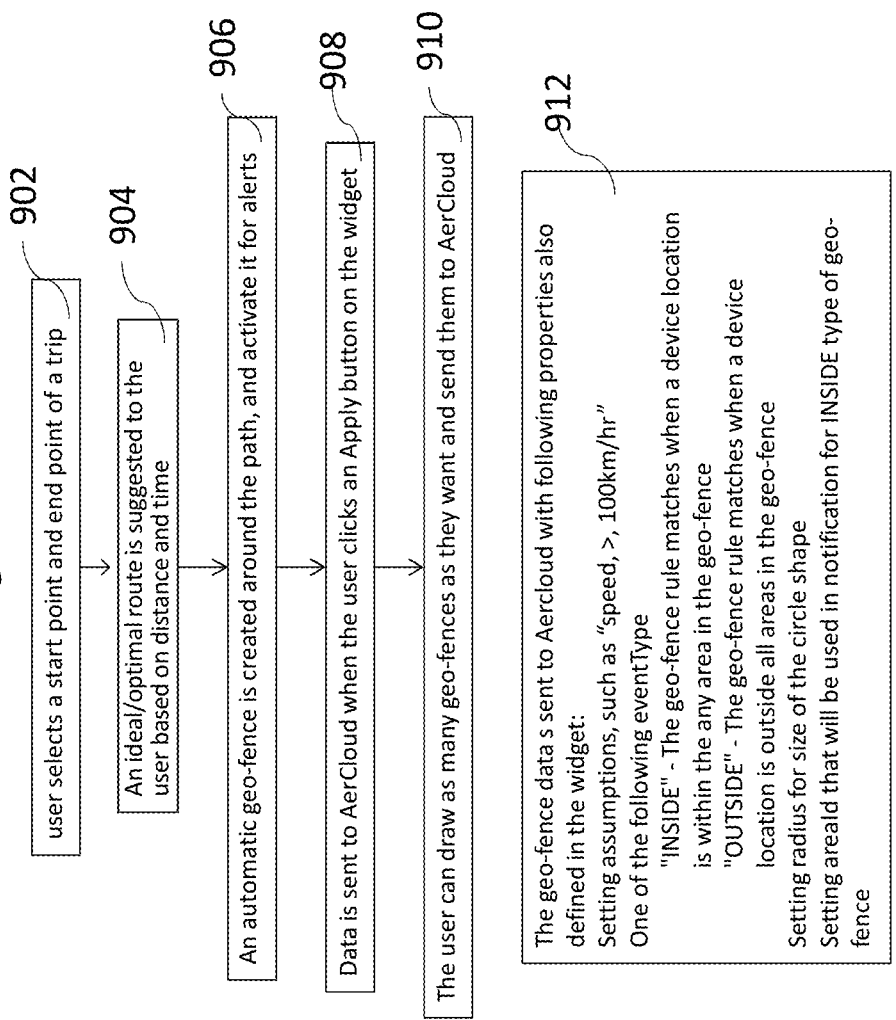
FIG. 9 is a flow diagram illustrating different steps involved in using automatically created "geofence" according to an embodiment of the present invention.

FIG. 9 is a flow diagram illustrating different steps involved in using automatically created "geofence" according to an embodiment of the present invention.

FIG. 10 illustrates an example of data structure that is sent to AerCloud according to an embodiment of the present invention.

FIG. 11 illustrates an example of Geofence workflow according to an embodiment of the present invention. Geofence is built on existing AerCloud concepts by allowing learned geographic location attributes to configure and evaluate geofence parameters as described below. The application works by posting a data model with learned location attributes, which is saved in a database with a model id. It then posts a data container associated to the data model, which is saved in a database with a container id. A subscription is posted to the container with a geofence, which is saved in a database with a subscription id and its corresponding container id and device location data is posted to the container id. The web service component first reads the geofence associated with the subscription and the learned location attributes from the data model associated with the container. Then the web service extracts location from the device data using learned location attribute names. According to one embodiment, the location information is then used to evaluate the geofence rule.

FIG. 12 illustrates an example of Geofence configuration according to an embodiment of the present invention. A shown in FIG. 9, a geofence can contain multiple geographical areas but each area must be a valid GeoJSON object with some required properties such as "areaId" which is used for notifying INSIDE event type and "radius" which is required if the object type is Point. Its value is the radius of a circle in meters.

FIG. 13 illustrates an example of criteria for evaluating a Geofence according to an embodiment of the present invention. For Geofence "event type" "inside" the "trigger criteria" can be set as "The geofence rule is "true" if a device location is within any area defined in the fence, otherwise "false"." According to one embodiment, device data is sent to an application only if the geofence rule is evaluated to true. The data is decorated with the "area id" that triggered the fence. For Geofence "event type" "outside" the "trigger criteria" can be set as "The geofence rule is "true" if a device location is outside all area defined in the fence, otherwise "false"." Thus, according to one embodiment, device data is sent to the application only if the geofence rule is evaluated to true.

FIG. 14 illustrates an example of learned location attributes according to an embodiment of the present invention. According to such an embodiment, learned location attributes includes normalizing the data model definition using the "metadata" field. For example, for "normalized property", the description can be "LOC_LAT", "LOC_LON" and/or "LOC_ALT". "LOC_LAT" indicates that this data model parameter designates latitude. Default is "latitude". "LOC_LON" indicates that this data model parameter designates longitude. Default is "longitude" and "LOC_ALT" indicates that this data model parameter designates altitude. Default is "altitude".

For example, according to one embodiment,

```
{
    "id" : "myDeviceDataModel_1",
    "scIDataSchema" : {
        "id" : "mySchema_1",
        "encoding" : "JSON",
```

-continued

```
"parameters" : [ {
    "name" : "deviceLatitude",
    "type" : "STRING",
    "isIndexed" : false,
    "metainfo" : {
        "uom" : "degree",
        "normalizedProperty" : "LOC_LAT"
    }
}, {
    "name" : "deviceLongitude",
    "type" : "STRING",
    "isIndexed" : false,
    "metainfo" : {
        "uom" : "degree",
        "normalizedProperty" : "LOC_LON"
    }
}, {
    "name" : "deviceAltitude",
    "type" : "STRING",
    "isIndexed" : false,
    "metainfo" : {
        "uom" : "degree",
        "normalizedProperty" : "LOC_ALT"
    }
} ]
}
}
```

Figure 15:
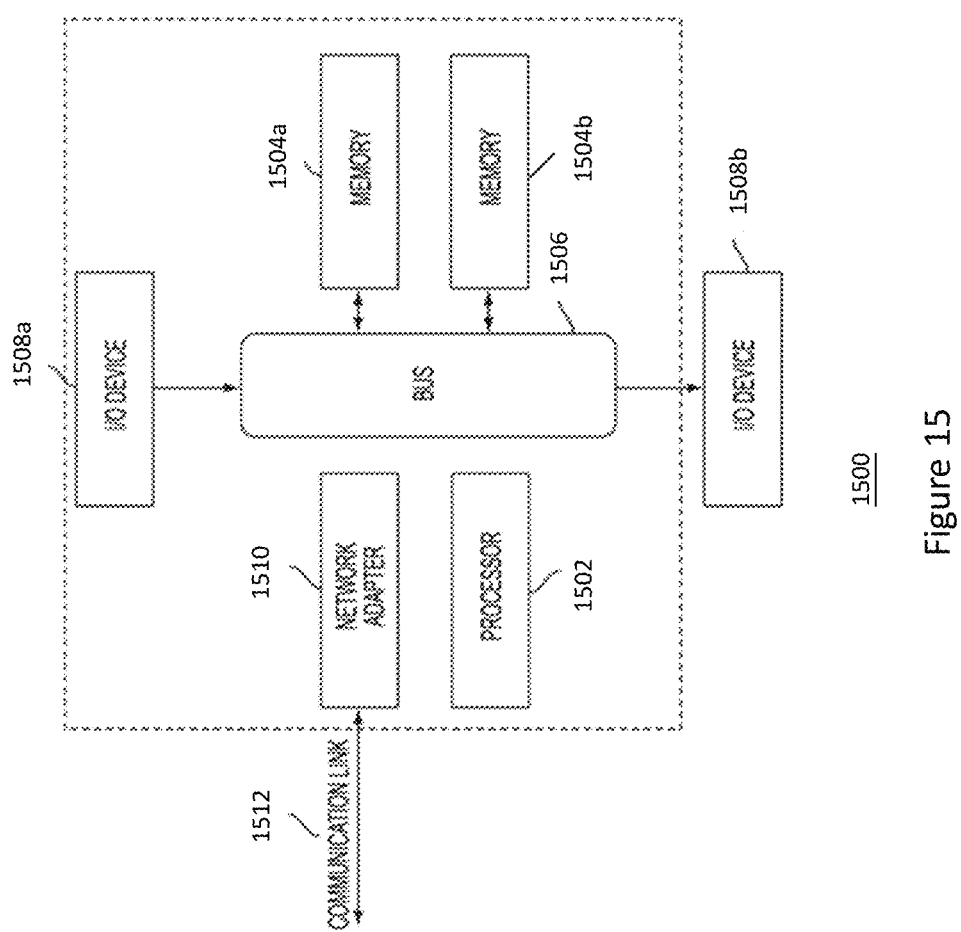
FIG. 15 illustrates a data processing system 1500 suitable for storing the computer program product and/or executing

FIG. 15 illustrates a data processing system 1500, suitable for storing the computer program product and/or executing program code in accordance with an embodiment described herein.

In an example embodiment, a non-transitory computer-readable medium is disclosed. The computer readable medium includes executable instructions stored therein that, when executed, cause one or more processors corresponding to a system for providing a geo-fence, the system including one or more mobile devices, a user interface and a data processing system having a learning database, to perform operations including configuring the geofence around a route to be monitored based on the route information for an optimum route with similar end-points; receiving device activity information from the one or more devices; evaluating device activity information based on predetermined geofence parameters relative to the geofence; and issuing an alert if any one of the one or more devices is performing outside the geofence parameters.

The data processing system 1500 includes a processor 1502 coupled to memory elements 1504a-b through a system bus 1506. In other embodiments, the data processing system 1500 may include more than one processor and each processor may be coupled directly or indirectly to one or more memory elements through a system bus.

Memory elements 1504a-b can include local memory employed during actual execution of the program code, bulk storage, and cache memories that provide temporary storage of at least some program code in order to reduce the number of times the code must be retrieved from bulk storage during execution. As shown, input/output or I/O devices 1508a-b (including, but not limited to, keyboards, displays, pointing devices, etc.) are coupled to the data processing system 1500. I/O devices 1508a-b may be coupled to the data processing system 1500 directly or indirectly through intervening I/O controllers (not shown).

In FIG. 15, a network adapter 1510 is coupled to the data processing system 1502 to enable data processing system 1502 to become coupled to other data processing systems or remote printers or storage devices through communication link 1512. Communication link 1512 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for monitoring activity of one or more devices relative to a geofence, the method comprising:
    configuring the geofence around a route to be monitored based on the route information for an optimum route with similar end-points, wherein configuring the geofence around a route to be monitored comprises:
        choosing a set of points along the route to be monitored;
        sampling at least two points from the set of points to form a parameterized curve;
        calculating parameterized points along the parameterized curve to act as anchor points for perpendiculars along the curve;
        calculating two points along each perpendicular at a predetermined distance from the route on either direction; and
        joining end points of the perpendiculars to form a polygon to create the geo-fence for the route to be monitored;
    receiving device activity information from the one or more devices,
    evaluating device activity information based on predetermined geofence parameters relative to the geofence; and
    issuing an alert if at least one of the one or more devices is performing outside the geofence parameters.

2. The computer-implemented method of claim 1, wherein the route information for one or more mobile devices comprises one or more of start location of the route, destination location for the route, time of the day for the travel, day of the week for the travel, duration of the travel, distance covered during the travel.

3. The computer-implemented method of claim 1, wherein device activity information from the one or more devices further comprises one or more of location of the device relative to the geofence, time of arrival of the device at a particular location, time of departure of the device from a particular location, speed of the device at a particular location, speed of the device at a particular time or a combination thereof.

4. The computer-implemented method of claim 1, wherein evaluating device activity relative to the geofence based on predetermined geofence parameters comprises comparing values provided by the user for one or more parameters to the values received as the device activity information for that parameter.

5. The computer-implemented method of claim 1, wherein evaluating device activity relative to the geofence based on predetermined geofence parameters comprises evaluating device activity information relative to location information for the one or more devices.

6. The computer-implemented method of claim 5, wherein the location information for the one or more devices is extracted from the device activity information using the learned location attributes.

7. The computer-implemented method of claim 1, wherein the one or more devices comprise a device including a processor, a memory, a communications adapter in communication with a network and a sensor.

8. A system for monitoring activity of one or more devices relative to a geofence comprising an enablement platform for building web sites and web applications using data storage and management capabilities of hosted web services, wherein the web application created by using the enablement platform
    receives learned location attributes and configures the geofence, wherein configuring the geo-fence around a route to be monitored comprises:
        choosing a set of points along the route to be monitored,
        sampling at least two points from the set of points to form a parameterized curve,
        calculating parameterized points along the parameterized curve to act as anchor points for perpendiculars along the curve,
        calculating two points along each perpendicular at a predetermined distance from the route on either direction, and
        joining end points of the perpendiculars to form a polygon to create the geo-fence for the route to be monitored;
    receives predetermined parameters for the configured geofence;
    tracks one or more devices and their activity relative to the geofence;
    evaluates device activity relative to the geofence based on the predetermined geofence parameters; and
    issues an alert if at least one of the one or more devices is performing outside the geofence parameters.

9. The system of claim 8, wherein the route information for one or more mobile devices comprises one or more of start location of the route, destination location for the route, time of the day for the travel, day of the week for the travel, duration of the travel, distance covered during the travel.

10. The system of claim 8, wherein device activity information from the one or more devices further comprises one or more of location of the device relative to the geofence, time of arrival of the device at a particular location, time of departure of the device from a particular location, speed of the device at a particular location, speed of the device at a particular time or a combination thereof.

11. The system of claim 8, wherein evaluating device activity relative to the geofence based on the predetermined geofence parameters comprises comparing values provided by the user for one or more parameters to the values received as the device activity information for that parameter.

12. The system of claim 8, wherein evaluating device activity relative to the geofence based on the predetermined geofence parameters comprises evaluating device activity information relative to location information for the one or more devices.

13. The system of claim 12, wherein the location information for the one or more devices is extracted from the device activity information using the learned location attributes.

14. The system of claim 8, wherein the one or more devices comprise a device including a processor, a memory, a communications adapter in communication with a network and a sensor.

15. A computer program product embodied on a non-transitory computer readable medium, comprising computer code which when executed by a computer causes the computer to perform a method for monitoring activity of one or more devices relative to a geofence comprising:
  configuring the geofence around a route to be monitored based on the route information for an optimum route with similar end-points, wherein configuring the geofence around a route to be monitored comprises:
    choosing a set of points along the route to be monitored;
    sampling at least two points from the set of points to form a parameterized curve;
      calculating parameterized points along the parameterized curve to act as anchor points for perpendiculars along the curve;
      calculating two points along each perpendicular at a predetermined distance from the route on either direction; and
      joining end points of the perpendiculars to form a polygon to create the geo-fence for the route to be monitored;
  receiving device activity information from the one or more devices;
  evaluating device activity information based on predetermined geofence parameters relative to the geofence; and
  issuing an alert if at least one of the one or more devices is performing outside the geofence parameters.

16. The computer program product of claim 15, wherein the learned location attributes further comprise one or more of a latitude, longitude, altitude or a combination thereof.

17. The computer program product of claim 15, wherein device activity information from the one or more devices further comprises one or more of location of the device relative to the geofence, time of arrival of the device at a particular location, time of departure of the device from a particular location, speed of the device at a particular location, speed of the device at a particular time or a combination thereof.

18. The computer program product of claim 15, wherein evaluating device activity relative to the geofence based on predetermined geofence parameters comprises comparing values provided by the user for one or more parameters to the values received as the device activity information for that parameter.

19. The computer program product of claim 15, wherein evaluating device activity relative to the geofence based on predetermined geofence parameters comprises evaluating device activity information relative to location information for the one or more devices.

20. The computer program product of claim 19, wherein the location information for the one or more devices is extracted from the device activity information using the learned location attributes.

21. The computer program product of claim 15, wherein the one or more devices comprise a device including a processor, a memory, a communications adapter in communication with a network and a sensor.

* * * * *